(12) United States Patent
Jackwerth et al.

(10) Patent No.: US 7,870,940 B2
(45) Date of Patent: Jan. 18, 2011

(54) FRICTIONALLY ENGAGED FREE-WHEEL CLUTCH

(75) Inventors: Siegfried Jackwerth, Friedrichsdorf/Ts. (DE); Thomas Heubach, Usingen/Ts. (DE)

(73) Assignee: RINGSPANN GmbH, Bad Homburg (DE)

( * ) Notice: Subject to any disclaimer, the term of this patent is extended or adjusted under 35 U.S.C. 154(b) by 663 days.

(21) Appl. No.: 11/759,349

(22) Filed: Jun. 7, 2007

(65) Prior Publication Data
US 2007/0284208 A1 Dec. 13, 2007

(30) Foreign Application Priority Data
Jun. 7, 2006 (DE) .................. 10 2006 026 774

(51) Int. Cl.
*F16D 41/066* (2006.01)
*F16D 41/07* (2006.01)
*F16D 41/06* (2006.01)

(52) U.S. Cl. .............. 192/45; 192/45.1; 192/41 A; 192/107 M; 192/107 T

(58) Field of Classification Search .............. None
See application file for complete search history.

(56) References Cited

U.S. PATENT DOCUMENTS

| 3,235,046 | A | * | 2/1966 | Fulton | 192/45.1 |
| 3,590,667 | A | * | 7/1971 | Berglein | 192/45 |
| 3,743,066 | A | * | 7/1973 | De Lavalette et al. | 192/41 A |
| 3,978,949 | A | * | 9/1976 | Timtner | 192/41 A |
| 4,553,869 | A | * | 11/1985 | Alexander et al. | 192/41 R |
| 4,878,570 | A | | 11/1989 | Zlotek | |
| 5,645,149 | A | * | 7/1997 | Maurer et al. | 192/45.1 |
| 2004/0007437 | A1 | * | 1/2004 | Linzell | 192/38 |
| 2005/0188793 | A1 | * | 9/2005 | Cherry | 81/57.33 |

FOREIGN PATENT DOCUMENTS

| DE | 1199066 A | 8/1965 |
| DE | 2439632 B2 | 3/1976 |
| DE | 2632072 A1 | 1/1978 |
| DE | 3117299 A1 | 4/1982 |
| DE | 3741518 C2 | 6/1989 |
| DE | 4114026 A1 | 10/1991 |
| DE | 4244203 A1 | 6/1994 |
| DE | 10009450 A1 | 8/2001 |
| DE | 102004028669 A1 | 12/2005 |
| EP | 1482212 A1 | 1/2004 |
| GB | 2343923 A | 5/2000 |
| WO | 93/00522 A1 | 1/1993 |

* cited by examiner

*Primary Examiner*—Rodney H Bonck
(74) *Attorney, Agent, or Firm*—Volpe and Koenig, P.C.

(57) ABSTRACT

A frictionally engaged free-wheel clutch with an exterior ring, an interior ring approximately concentric in reference thereto, and several clamping bodies arranged in the circular gap between the interior and the exterior ring, which block a rotation of the interior ring relative to the exterior one in one direction and release it in the opposite direction. Here, it is essential that the clamping body and/or the running paths of the interior and/or the exterior ring are provided with a friction-increasing coating.

12 Claims, 6 Drawing Sheets

FRICTIONALLY ENGAGED FREE-WHEEL CLUTCH

BACKGROUND

The invention relates to a frictionally engaged free-wheel clutch with an exterior ring, an interior ring approximately concentric in reference thereto, and several clamping bodies arranged in the circular gap between the interior and the exterior ring, which in one direction block a rotation of the interior ring relative to the exterior ring, and release it in the other direction.

Such free-wheel clutches, also called overriding clutches, return stops, or advance release free-wheels, operate according to the known principle, that the clamping bodies block a relative rotation of the interior ring in reference to the exterior ring in one direction, by the interior and/or the exterior ring entraining them in a frictionally engaged manner, so that they get clamped between the interior ring and the exterior ring. However, with a relative rotation in the opposite direction the clamping bodies are released from said clamping position.

Here, two designs are distinguished, namely the clamping body free-wheels and clamping roller free-wheels. In the clamping body free-wheels, the interior ring and the exterior ring have circular cylindrical running paths and the clamping bodies have a rotationally asymmetrical cam-like profile. In a rotation of the interior ring relative to the exterior ring in the blocking direction the clamping bodies erect and wedge in the circular gap between the interior and the exterior ring.

In the clamping roller free-wheels, however, clamping ramps are arranged on the interior or the exterior ring, on which the cylindrical clamping rollers run up during a rotation in the blocking direction and become rotated in a frictionally engaged manner between the interior and the exterior ring.

In order to ensure the constant ability for engagement, the clamping bodies are pressed slightly against the running path of the interior and the exterior ring by way of a spring.

The present invention relates to both types of free-wheel designs.

SUMMARY

The present invention is based on the object of improving the known free-wheel clutches with regard to the transferable torque as well as an increased safety from slippage.

This objective is attained according to the invention in that the clamping bodies and/or the running paths of the interior and the exterior ring are provided with a coating having an increased frictionally engaged effect.

This results in the advantage that the clamping bodies create a higher blocking force and the limit at which the clamping bodies may begin to slip is raised. This way the free-wheel can transfer a higher torque without requiring stronger dimensions.

Larger production tolerances both for the clamping bodies as well as for the running paths are also possible because although small variations in production may result in reduced friction, however the overall higher friction level allows sufficient reserve for the clamping effect, in particular in case of eccentricity of the interior in reference to the exterior ring.

It is already known from U.S. Pat. No. 4,878,570 in frictionally engaged free-wheel clutches to treat the clamping bodies with ion implants at their clamping surfaces by inserting nitrogen ions. These nitrogen ions remove flaws in the surface structure and cause hardening and solidification. Indications for an influence on the friction values, in particular in the sense of an increase in friction, are not discernible from this publication.

Beneficially, the present coating comprises at least partially particles embedded in the clamping surfaces, in particular in the surface of the clamping body. Here, in particular corundum and diamond particles as well as various carbide particles can be used, in particular silicon carbide, tungsten carbide, or boron carbide particles. They have in common that they represent some of the hardest materials available and thus ensure lasting increased friction values. These particles may also be used easily in a method already known, for example by embedding them in a nickel matrix. Chemical nickel plating offers the insurance for an even, precisely predetermined thickness of coating so that the basic body geometry is not changed. A coating with diamond particles is also advantageous in that here a heat treatment can be performed which causes the bonding of the diamond particles to the base material to be optimized. In this manner the life of the coating of the clamping bodies can be increased by a simple and cost-effective method. However, other coating means or other particles for increasing friction are also possible.

Additionally, it is recommended to modify the profile of the clamping bodies, or when clamping rolls are used, the profile at the interior and/or exterior ring in the areas contacting the running path of the interior and/or the exterior ring such that the progression of the clamping angle $\tan \epsilon$ is larger than 0.12, in particular larger than 0.15, preferably larger than 0.2. For an identical torque, lower normal forces act upon the running paths due to such large clamping angles so that lower Hertzian stress develops at the contact sites of clamping body/running path. This also increases the life of the free-wheel clutch or allows a larger torque to be transferred over the same life.

A particularly beneficial further embodiment of the invention comprises to combine the increase in friction value with the clamping bodies lifting off under centrifugal force, because this way the friction-increasing coating cannot cause any increased wear under idling operation. This lifting by centrifugal force can occur either off the interior or the exterior ring. In the latter-mentioned case the clamping bodies are arranged at a support, for example a support ring, compensating the centrifugal forces. This way the use of clamping bodies lifting off by centrifugal force allows an increased transfer of torque and/or life without negatively affecting the idle operation by increasing the friction value. In free-wheels of this construction type the advantages of a friction-increasing layer can be used best.

A method for producing the coated clamping body therefore includes inserting the friction increasing particles in the micro-range into the clamping surfaces of the clamping body and/or the interior or exterior ring, in particular are impressed there.

BRIEF DESCRIPTION OF THE DRAWINGS

Additional features and advantages of the invention are discernible from the following description of exemplary embodiments and from the drawings. Shown are.

DETAILED DESCRIPTION OF THE PREFERRED EMBODIMENTS

Figure 1:
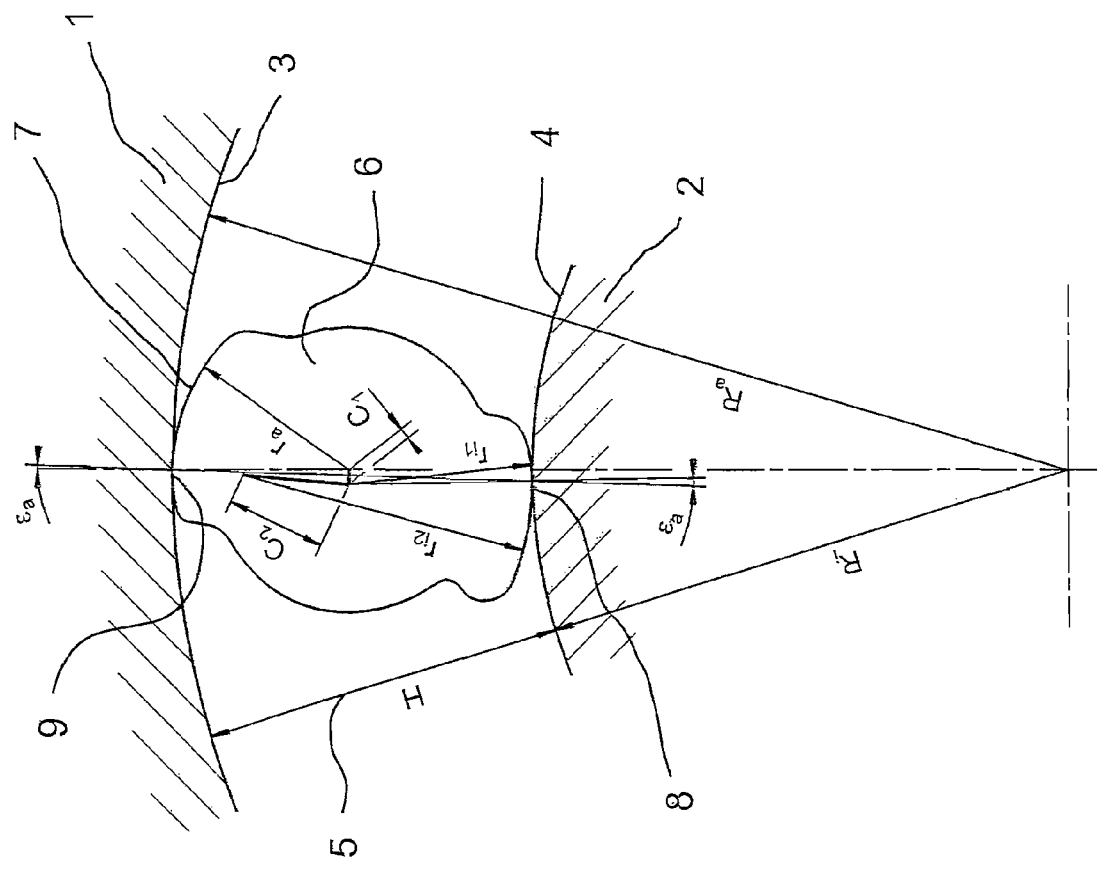
FIG. 1: a radial partial cross-sectional view of a free-wheel clutch with clamping bodies in form of rotationally asymmetric clamping bodies.

FIG. 1 shows a radial cross-section of a free-wheel with the essential components of a frictionally engaged free-wheel clutch. The exterior ring 1 of the free-wheel with its interior cylinder forms the exterior running path 3, the interior ring 2 of the free-wheel with its exterior cylinder the interior running path 4. Between the interior ring and the exterior ring numerous clamping bodies are arranged that can be tilted, of which clamping body 6 is visible here, which can be rotated with its interior clamping surface 8 against the interior running path 4 and with its exterior clamping surface 9 against the exterior running path 3. Here, the distance between the running paths 3, 4, i.e. the difference between the radii of the interior and/or the exterior cylinder 3, 4, is predetermined by the height of the gap 5. The exterior and the interior ring as well as the clamping body are made of steel.

According to the invention, the surface 7 of the clamping body 6 is provided with a friction-increasing coating, at least at the clamping surfaces 8, 9.

Figure 2B:
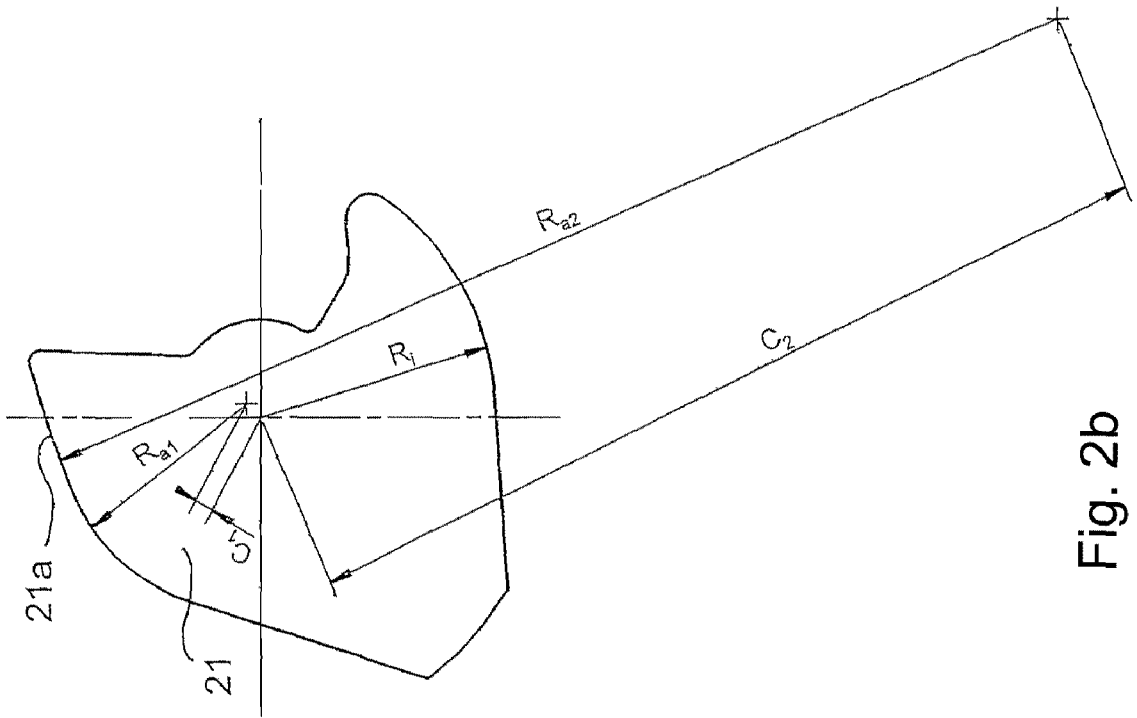
FIGS. 2a and 2b: a view with a comparison between a conventional clamping body geometry and one according to the invention.
Figure 2A:
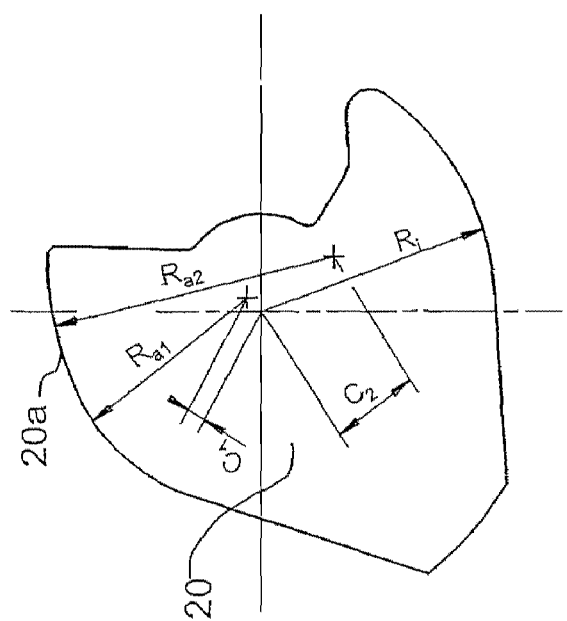

In FIGS. 2a and 2b two different clamping bodies 20 and 21 are shown: a conventional clamping body 20 without any friction increasing coating having a conventional surface profile 20a, which reaches a maximum clamping angle tan $\epsilon$ of approximately 0.1 and a second clamping body 21 with a friction-increasing coating according to the invention and a new clamping body profile 21a, having a maximum clamping angle tan $\epsilon$ of approx. 0.3. The new clamping profile 21a is created such that at least one of the clamping surfaces has a considerably larger bend radius than those of prior art; in the exemplary embodiment this is the bend radius Ra2 of the exterior clamping surface 9. Accordingly, the offset C2 between the centers of the bend radii relevant for the clamping surface increases. This modified profile geometry is the cause for achieving higher clamping angles.

Figure 3:
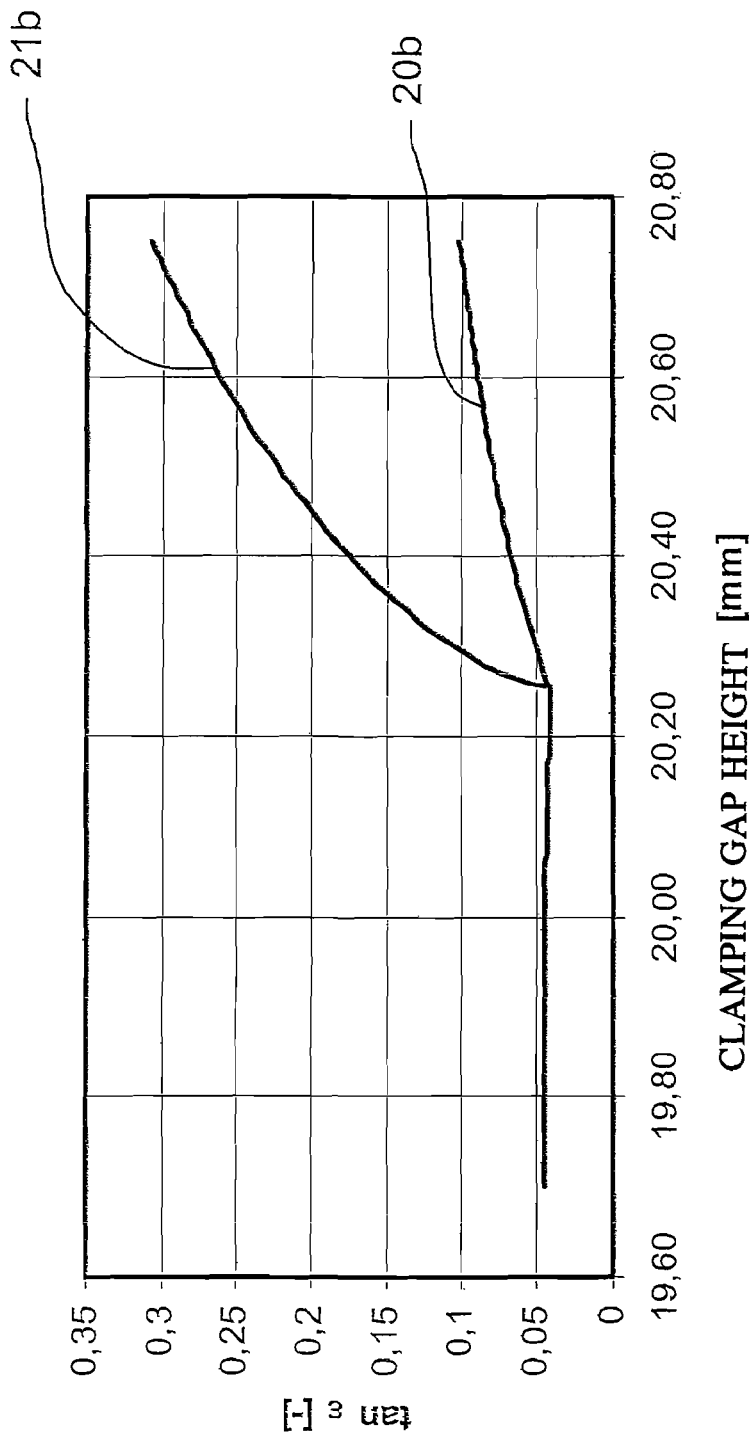
FIG. 3: a chart with clamping angle progressions of an uncoated clamping body and a clamping body coated according to the invention, optimized in its profile geometry.

FIG. 3 graphically shows the respective clamping angle progressions 20b, 21b, each for the clamping bodies 20 and/or 21. It is clearly discernible that by the coating and the different profile shape a considerably steeper incline of the clamping angle $\epsilon$ results over the height of the clamping gap and thus causes a strong increase of the maximum torque that can be transferred.

Figure 4:
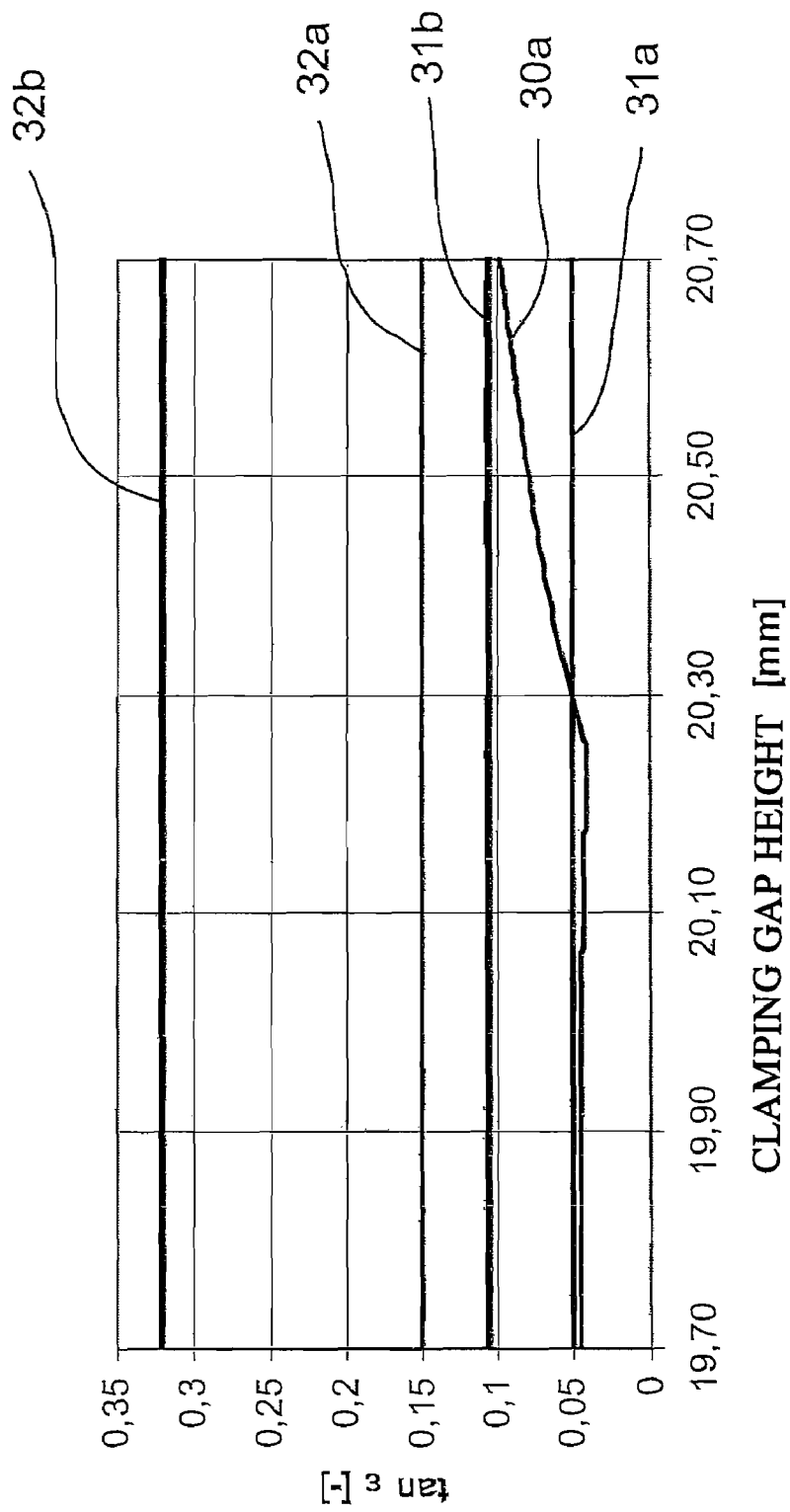
FIG. 4: a chart with an overview over the friction ratios.

FIG. 4 illustrates the connections shown between the coating and the new profile geometry. The curve 30a shows the progression of the clamping angle at an uncoated body and a clamping body coated according to the invention with the same profile. The progression on the clamping angle is identical for both clamping bodies because the geometry remained unchanged.

The curve 31a shows the friction value at the time of switch-on, the curve 31b shows the friction value in the high power range. In the range of the switching-on mode this friction value is much lower than in the high-power range, because at the beginning of the torque transfer a lubricant is still present at the contact sites, which initially must be penetrated.

The curves 32a and 32b show the friction value at the switch-on moment and/or in the high-power range for clamping bodies coated according to the invention. It is clearly discernible that here the friction values are higher than in the uncoated state. This increase represents an increase in safety with regard to early slippage. This safety can be optimally used in that the clamping geometry of the clamping bodies or the clamping ramps is changed in the sense of a higher maximum clamping angle $\epsilon$.

Figure 5:
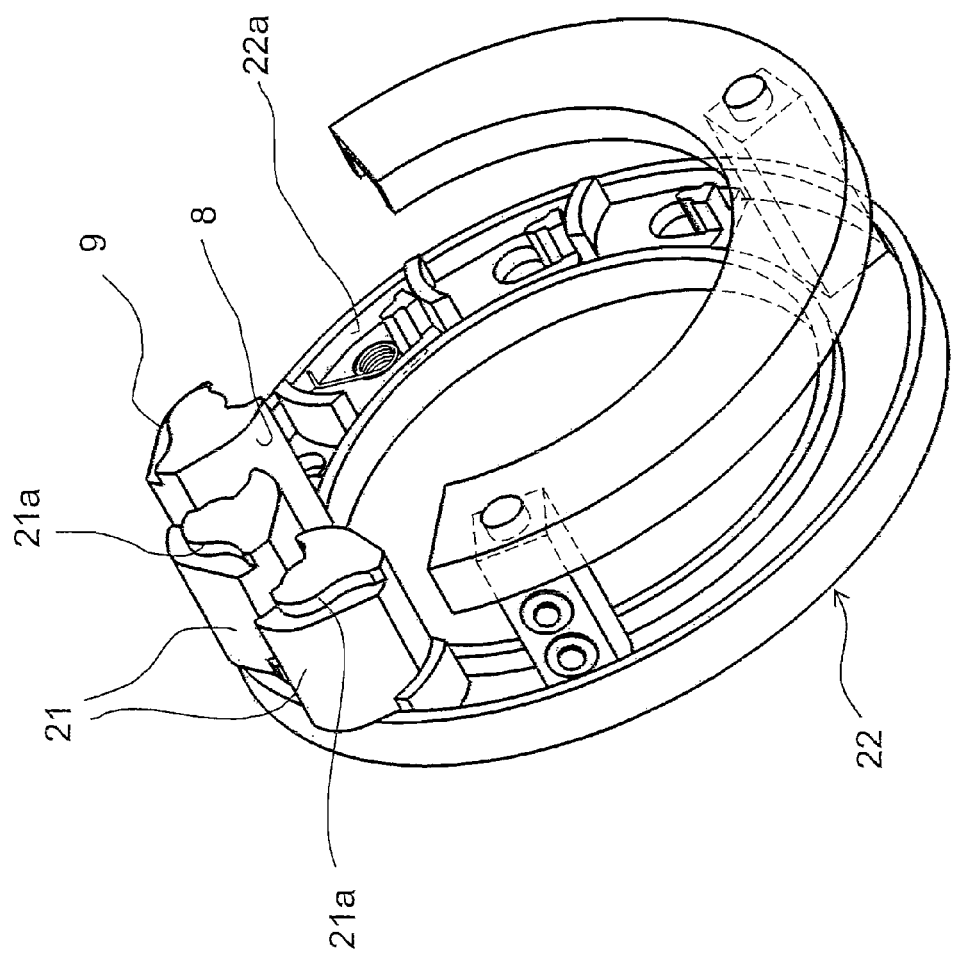
FIG. 5: a perspective view of a free-wheel lifting off the exterior ring by centrifugal force.

FIG. 5 shows the application of the invention in clamping bodies, which can lift-off the fixed exterior ring under the influence of centrifugal force. For this purpose the clamping bodies 21 are pivotally supported in a cage ring 22, with the ramps 21a protruding on both sides being supported at the cylindrical interior surface of the exterior ring 22a. The geometry of the clamping body 21 has been selected such that its center of gravity in reference to the pivot axis is laterally offset such that it executes a pivotal motion, beginning from a certain free-wheel rotation, under the influence of centrifugal force which leads to the clamping surfaces 9 of the exterior clamping bodies lifting-off the free-wheel exterior ring, not shown in the drawing. However, the cage encapsulating the clamping body is in a frictionally engaged contact with the free-wheel interior ring and is entrained by it. Ultimately the cage ring rotates together with the interior ring without any contact existing between the clamping bodies and the immobile exterior ring. The coating increasing friction therefore does not lead to any increase wear.

Figure 6B:
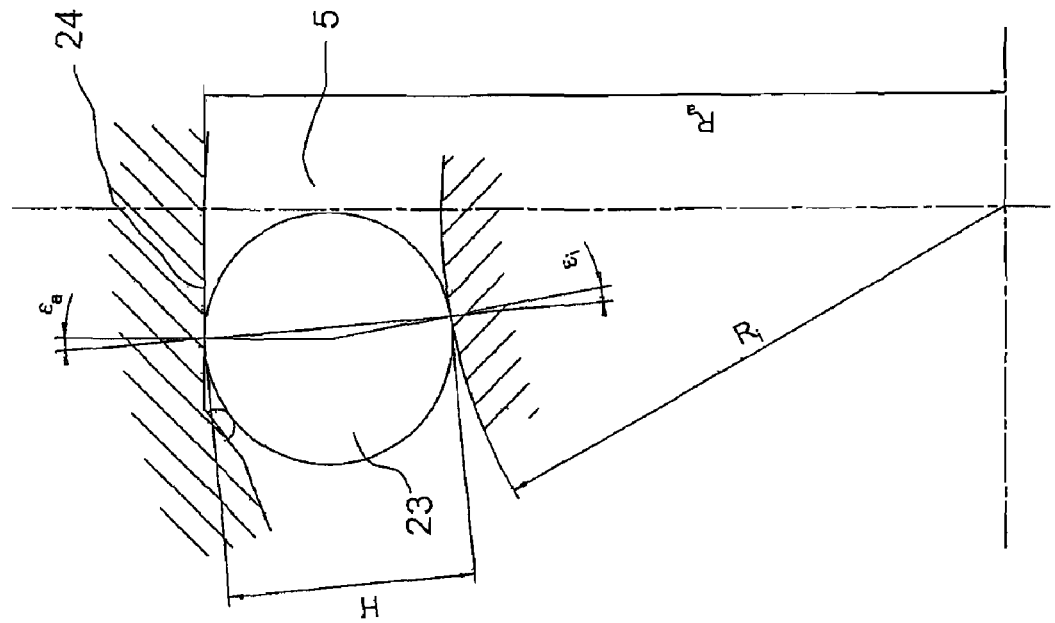
FIGS. 6a and 6b: a partial cross-sectional view according to FIG. 1, in this case with a clamping roller free-wheel.
Figure 6A:
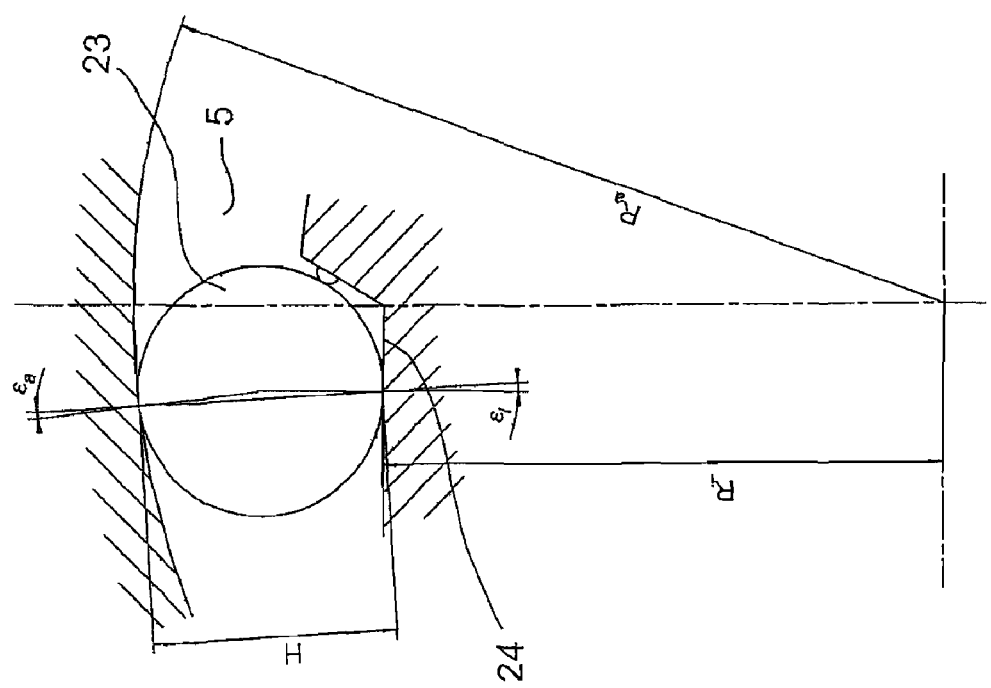

FIGS. 6a and 6b show, only for reasons of completeness, the use of the invention in a clamping roller free-wheel. Here, the clamping bodies comprise cylindrical rolls 23, while the running paths of the interior ring (FIG. 6a) or the exterior ring (FIG. 6b) are provided with ramps 24, which constrict the circular gap 5 as clamping surfaces and in a known manner allow a relative rotation between the interior and the exterior ring, however blocking it in the opposite direction.

Even in such free-wheels the coating according to the invention may be applied at the clamping rolls and/or the running paths of interior and exterior ring, at least at their ramps 24.

The invention claimed is:

1. A frictionally engaged free-wheel clutch comprising an exterior ring (1), an interior ring (2) approximately concentric in reference thereto, and several clamping bodies (6, 21, 23), which are rotationally asymmetrical clamping bodies or clamping rolls, arranged between the interior ring and the exterior ring, which block a rotation of the interior ring relative to the exterior ring in one direction and release it in the other direction, the clamping bodies (6, 21, 23) and/or running paths (3, 4) of the interior ring and the exterior ring are provided with a friction increasing coating, wherein for the clamping bodies comprising the rotationally asymmetrical clamping bodies (6, 21) with a profile geometry and for the clamping bodies comprising the clamping rolls with a profile provided on the interior or exterior rings, a clamping angle progression in reference to respective clamping surfaces (8, 9, 24) has a maximum clamping angle tan $\epsilon > 0.12$, and an increasing branch of a curve of the clamping angle begins at tan $\epsilon \leq 0.05$ and inclines at least to approximately 0.25.

2. A free-wheel clutch according to claim 1, wherein the coating comprises at least partially corundum, diamond, or carbide particles embedded in a surface of the clamping body (7).

3. A free-wheel clutch according to claim 2, wherein the coating comprises at least one of silicon carbide, tungsten carbide, or boron carbide particles.

4. A free-wheel clutch according to claim 1, wherein tan ε>0.15.

5. A free-wheel clutch according to claim 1, wherein tan ε>0.2.

6. A free-wheel clutch according to claim 1, wherein the clamping bodies comprise the rotationally asymmetrical clamping bodies and a profile (7) of the clamping bodies is embodied in areas (8, 9) contacting the running paths such that during engagement of the free-wheel, the clamping angle is effective for tan ε≧0.05.

7. A free-wheel clutch according to claim 6, wherein the clamping angle is effective for tan ε≧0.06.

8. A free-wheel clutch according to claim 1, wherein the clamping bodies comprise the rotationally asymmetrical clamping bodies (21) and are lifted-off by centrifugal force.

9. A free-wheel clutch according to claim 8, wherein the clamping bodies (21) lifted off the exterior ring by centrifugal force are supported by a support (22).

10. A free-wheel clutch according to claim 9, wherein the clamping bodies (21) are supported via lateral ramps (21*a*) or a slot in a cage (22) or a supporting ring.

11. A free-wheel clutch according to claim 1, wherein the clamping bodies comprise the rotationally asymmetrical clamping bodies, and the exterior ring (1) and the interior ring (2) are cylindrical.

12. A free-wheel clutch according to claim 1, wherein the clamping bodies comprise the clamping rolls, and the exterior ring (1) and/or the interior ring (2) are provided with clamping ramps (24) in a circular gap.

* * * * *